Patented Mar. 28, 1944

2,345,385

UNITED STATES PATENT OFFICE 2,345,385

PYRAZOLONE SALTS OF SULPHONAMIDES

Max Dohrn, Berlin-Charlottenburg, and Paul Diedrich, Finkenkrug, Osthavelland, near Berlin, Germany, assignors to Schering Corporation, Bloomfield, N. J., a corporation of New Jersey No Drawing. Application May 3, 1941, Serial No. 391,717. In Germany October 13, 1938

9 Claims. (Cl. 260—239.6)

This invention relates to derivatives of sulphonamides and more particularly to phenyldimethyl pyrazolone salts of sulphonamides and a method of making the same and is a continuation in part of our copending application Ser. No. 253,734, filed January 31, 1939.

In said application Serial No. 253,734 there is described the manufacture of inorganic salts and of certain organic salts of cyclic sulphonamides of the general formula R.SO$_2$.NH.X, wherein R is an aromatic, heterocyclic or aromatic-heterocyclic residue containing at least one nuclearly bound amino group or a group convertible thereinto with the aid of reduction or hydrolysis, in the p- or 4-position to the sulphonamide group, while X represents an acyl residue. The processes for the manufacture of the compounds of the formula R.SO$_2$.NH.X are now well understood and need not, therefore, be described here in detail.

Now, we found that of the salts of the above-described acylated sulphonamides with organic bases, the hitherto unknown salts with phenyl dimethyl pyrazolones or their amino or alkylated amino derivatives such as, for instance, 1-phenyl-2,3-dimethyl-4-dimethyl amino pyrazolone-5, have an especially good effect on influenza and the like illnesses. They are manufactured according to the usual methods known for making salts.

The following example serves to illustrate the invention, without, however, limiting the same to it:

Example 23.1 g. of 1-phenyl-2,3-dimethyl-4-dimethyl amino-pyrazolone and 21.4 g. of 4-amino benzene sulphon acetamide are heated to boiling with 250 cc. of water, until everything is dissolved. On cooling, the 1-phenyl-2,3-dimethyl-4-dimethyl-amino pyrazolone-5-salt of the 4-amino benzene sulphon acetamide precipitates from the solution in solid prisms with a melting point of 109° C. Yield: almost quantitative.

In the same way the 1-phenyl-2,3-dimethyl pyrazolone-5 salt of p-amino benzene sulphon acetamide and the salts of these pyrazolone derivatives with other p-amino benzene sulphon acylamides may be produced.

Of course, many changes and variations in the reaction conditions, the solvents and components used, the manner of purifying the salts obtained and the like may be made by those skilled in the art in accordance with the principles set forth herein and in the claims annexed hereto.

What we claim is:

1. A salt of a phenyl dimethyl pyrazolone compound with a sulphonamide compound of the following formula

R.SO$_2$.NH.X wherein R indicates a member of the group consisting of aromatic, heterocyclic and aromatic-heterocyclic residues containing at least one member of the class consisting of nuclearly bound amino groups and groups convertible thereinto by a treatment selected from the group consisting of reduction and hydrolysis in p-position to the sulphonamide group, while X represents an acyl residue.

2. A salt of a phenyl dimethyl pyrazolone compound with a p-amino phenyl sulphon acylamide.

3. A salt of a phenyl dimethyl pyrazolone compound with p-amino phenyl sulphon acetamide.

4. A salt of 1-phenyl-2,3-dimethyl-4-dimethyl-aminopyrazolone-5 with a sulphonamide compound of the following formula

R.SO$_2$.NH.X wherein R indicates a member of the group consisting of aromatic, heterocyclic and aromatic-heterocyclic residues containing at least one member of the class consisting of nuclearly bound amino groups and groups convertible thereinto by a treatment selected from the group consisting of reduction and hydrolysis in p-position to the sulphonamide group, while X represents an acyl residue.

5. A salt of 1-phenyl-2,3-dimethyl-4-dimethyl-aminopyrazolone-5 with a p-amino phenyl sulphon acylamide.

6. A salt of 1-phenyl-2,3-dimethyl-4-dimethyl-aminopyrazolone-5 with p-amino phenyl sulphon acetamide.

7. A salt of 1-phenyl-2,3-dimethyl pyrazolone-5 with a sulphonamide compound of the following formula

R.SO$_2$.NH.X wherein R indicates a member of the group consisting of aromatic, heterocyclic and aromatic-heterocyclic residues containing at least one member of the class consisting of nuclearly bound amino groups and groups convertible thereinto by a treatment selected from the group consisting of reduction and hydrolysis in p-position to the sulphonamide group, while X represents an acyl residue.

8. A salt of 1-phenyl-2,3-dimethyl pyrazolone-5 with a p-amino phenyl sulphon acylamide.

9. A salt of 1-phenyl-2,3-dimethyl pyrazolone-5 with p-amino phenyl sulphon acetamide.

MAX DOHRN.
PAUL DIEDRICH.